US008950273B2

(12) United States Patent
Wagner

(10) Patent No.: US 8,950,273 B2
(45) Date of Patent: Feb. 10, 2015

(54) METHOD AND THERMAL, FLOW MEASURING DEVICE FOR DETERMINING AND/OR MONITORING AT LEAST ONE VARIABLE DEPENDENT ON AT LEAST THE CHEMICAL COMPOSITION OF A MEASURED MEDIUM

(75) Inventor: Michel Wagner, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 787 days.

(21) Appl. No.: 13/127,056

(22) PCT Filed: Oct. 27, 2009

(86) PCT No.: PCT/EP2009/064127
§ 371 (c)(1),
(2), (4) Date: May 2, 2011

(87) PCT Pub. No.: WO2010/049410
PCT Pub. Date: May 6, 2010

(65) Prior Publication Data
US 2011/0209526 A1 Sep. 1, 2011

(30) Foreign Application Priority Data

Oct. 30, 2008 (DE) .......................... 10 2008 043 327

(51) Int. Cl.
*G01F 1/68* (2006.01)
*G01F 1/76* (2006.01)
(Continued)

(52) U.S. Cl.
CPC .......... *G01F 1/6965* (2013.01); *G01F 25/0007* (2013.01)
USPC ..................... 73/861.04; 73/25.01; 73/204.11

(58) Field of Classification Search
USPC ................ 73/25.01, 861.04, 204.11; 252/372
See application file for complete search history.

(56) References Cited

U.S. PATENT DOCUMENTS 3,898,882 A * 8/1975 Prokopius .................. 73/861.04
5,415,024 A * 5/1995 Proffitt et al. ................ 73/61.44
(Continued)

FOREIGN PATENT DOCUMENTS

DE 10 2005 018 707 A1 11/2006
DE 10 2006 030 964 A1 1/2008
(Continued)

OTHER PUBLICATIONS

German Search Report.
(Continued)

*Primary Examiner* — Lisa Caputo
*Assistant Examiner* — Punam Roy
(74) *Attorney, Agent, or Firm* — Bacon & Thomas, PLLC

(57) ABSTRACT

Method and thermal, flow measuring device for determining at least one variable dependent on at least the chemical composition of a measured medium, wherein the measured medium has n components, wherein n is greater than or equal to two, wherein each mole fraction, volume fraction and/or mass fraction of m components of the medium is measured, wherein m is smaller than or equal to n minus one, wherein the mole fractions, volume fractions and/or mass fractions of the k components of the measured medium which are not measured, and wherein k is equal to n minus m, are established in such a manner, that the sum of the mole fractions, volume fractions and/or mass fractions of the n components amounts to one.

14 Claims, 3 Drawing Sheets

(51) Int. Cl.
*G01F 1/696* (2006.01)
*G01F 25/00* (2006.01)

(56) References Cited

U.S. PATENT DOCUMENTS

| | | | |
|---|---|---|---|
| 6,688,159 B1* | 2/2004 | Grunewald | 73/25.03 |
| 7,871,826 B2* | 1/2011 | Peng et al. | 436/139 |
| 2002/0040590 A1* | 4/2002 | Schley | 73/23.2 |
| 2008/0034889 A1* | 2/2008 | Moller | 73/861.351 |
| 2010/0107729 A1* | 5/2010 | Cline et al. | 73/23.37 |

FOREIGN PATENT DOCUMENTS

| | | |
|---|---|---|
| EP | 0 281 780 B1 | 9/1988 |
| EP | 0 829 793 B1 | 6/2003 |
| EP | 1 426 740 A2 | 6/2004 |
| GB | 2 433 315 A | 6/2007 |
| WO | WO 02/46705 A2 | 6/2002 |
| WO | WO 2005/080926 A1 | 9/2005 |
| WO | WO 2007/063114 A2 | 6/2007 |

OTHER PUBLICATIONS

International Search Report.

English translation of the International Preliminary Examination Report.

* cited by examiner

METHOD AND THERMAL, FLOW MEASURING DEVICE FOR DETERMINING AND/OR MONITORING AT LEAST ONE VARIABLE DEPENDENT ON AT LEAST THE CHEMICAL COMPOSITION OF A MEASURED MEDIUM

TECHNICAL FIELD

The present invention relates to a method and a thermal, flow measuring device for determining at least one variable dependent on at least the chemical composition of a measured medium, wherein the measured medium has n components, wherein n is greater than or equal to two, wherein each mole fraction, volume fraction and/or mass fraction of m components of the measured medium is measured, wherein m is smaller than or equal to n minus one, wherein the mole fractions, volume fractions and/or mass fractions of the k components of the measured medium which are not measured, wherein k is equal to n minus m, are assigned in such a manner, that the sum of the mole fractions, volume fractions and/or mass fractions of the n components amounts to one.

BACKGROUND DISCUSSION

Thermal, flow measurement is based essentially on two measuring principles, thermal dispersion and thermal profile, or temperature rise. In the case of thermal dispersion, a heated measuring element is exposed to the flow of the measured medium. The cooling rate caused thereby is a measure for the flow velocity. In the case of thermal profile, or temperature rise, heat is introduced into a limited region of the flow, whereby the temperature is locally increased, from which, together with the supplied energy, the mass flow can in turn be calculated. In such case, two temperature sensors measure the temperatures of the measured medium at different points, most often before and after the supplied heat. A number of heating elements and temperature sensors are also put to use in order to obtain a better picture of the thermal profile.

In the case of both measuring methods, the sensors can be placed in the main line or in a bypass. The two principles overlap significantly in practice.

Conventional thermal, flow measuring devices for industrial processes usually use two temperature sensors embodied as equally as possible, which are arranged most often in pin-shaped, metal sleeves—so-called stingers—and which are in thermal contact with the medium flowing through a measuring tube or through the pipeline.

The two temperature sensors are usually installed in a measuring tube; the temperature sensors can, however, also be mounted directly in the pipeline. One of the two temperature sensors is a so-called active temperature sensor, which is heated by means of a heating unit. As heating unit, either an additional resistance heating unit is provided, or the temperature sensor is a resistance element, e.g. an RTD (Resistance Temperature Device) sensor, which is heated by conversion of an electrical power, e.g. by a corresponding variation of the electrical measuring current. More recently, so-called thin-film resistance elements, so called Thin Film Resistance Temperature Devices (TFRTD) have also been put to use. The second temperature sensor is a passive temperature sensor: It measures the temperature of the medium.

Usually, in a thermal, flow measuring device, the heatable temperature sensor is heated in such a manner, that a fixed temperature difference is set between the two temperature sensors. Alternatively, it has also been known to supply a constant heating power via a control unit.

If there is no flow in the measuring tube, then an amount of heat constant in time is required for maintaining the predetermined temperature difference. If, in contrast, the medium to be measured is moving, then the cooling of the heated temperature sensor is essentially dependent on the mass flow of the medium flowing past. Since the medium is colder than the heated temperature sensor, heat is transported away from the heated temperature sensor by the flowing medium. In order to thus maintain the fixed temperature difference between the two temperature sensors in the case of flowing medium, an increased heating power is required for the heated temperature sensor. The increased heating power is a measure for the mass flow of the medium through the pipeline.

If, in contrast, a constant heating power is fed in, the temperature difference between the two temperature sensors is lessened as a result of the flow of the medium. The particular temperature difference is then a measure for the mass flow of the medium through the pipeline or through the measuring tube.

There is thus a functional relationship between the heating energy needed for heating the temperature sensor and the mass flow through a pipeline or through a measuring tube. The dependence of the heat transfer coefficient on the mass flow of the medium through the measuring tube or through the pipeline is utilized in thermal, flow measuring devices for determining mass flow. Devices which operate according to this principle are available from the assignee under the designations, "t-switch", "t-trend" or "t-mass".

Thermal, flow measuring devices are especially suited for flow measurement of gases or gas mixtures.

Conventionally, the quantitative chemical composition of the measured medium must be known and must be configured in the measuring device. Thus, the mole fraction, volume fraction or mass fraction of each individual component of the measured medium, or parameters representing these, are input to the measuring device. In such case, gas mixtures with a plurality of components can be measured. In the case of applications with a variable composition for the fluid, measurement errors arise because the device calculates using fluid properties other than those actually present in the measuring tube at the point in time of measurement.

As is known to those skilled in the art, flow measurements with thermal, mass flow, measuring devices are, in general, dependent on the fluid measured medium. If the chemical composition of the measured medium, and therewith the heat transfer function of the measured medium, changes in the measuring device, the measuring device must be adjusted for this change in the chemical composition of the measured medium, i.e. specific parameters must be adjusted, in order to continue to measure the correct flow through the measuring tube.

Therefore, either the quantitative chemical composition of the measured medium is determined with a gas analysis method virtually continuously, or discretely with a relatively high measuring frequency, which is very complicated and expensive, or the quantitative chemical composition of the measured medium is estimated, and a measurement error of the thermal, flow measuring device is tolerated.

SUMMARY OF THE INVENTION

An object of the invention is to provide a method, with which the quantitative chemical composition of the measured medium is determinable in a cost-effective manner.

The object is achieved by a method for determining at least one variable dependent on at least the chemical composition of a measured medium, wherein the measured medium has n components, wherein n is greater than or equal to two, wherein each mole fraction, volume fraction and/or mass fraction of m components of the measured medium is measured, wherein m is smaller than or equal to n minus one, wherein the mole fractions, volume fractions and/or mass fractions of the k components of the measured medium which are not measured, wherein k is equal to minus m, are established in such a manner, that the sum of the mole fractions, volume fractions and/or mass fractions of the n components amounts to one.

The variable to be determined is determined as a function of the quantitative chemical composition of the measured medium. The chemical composition is ascertained partially by measuring and partially set. The measured medium can, in such case, be present both in liquid as well as also in gaseous form, and can contain solids.

Since m<n, at least one fluid parameter—this fluid parameter reflecting a mole fraction, volume fraction and/or mass fraction of a certain component of the fluid—less than the number of components the fluid has is measured, or the mole fractions, volume fractions and/or mass fractions of components of the fluid are ascertained via direct or indirect measuring, wherein the mole fraction, volume fraction and/or mass fraction of at least one component is not ascertained.

In a first embodiment of the solution of the invention, the mole fractions, volume fractions and/or mass fractions of at least two components of the measured medium are not ascertained via direct or indirect measuring. In an additional embodiment of the invention, only the mole fraction, volume fraction and/or mass fraction of one component of the measured medium is measured or ascertained via direct or indirect measuring.

In a further development of the method of the invention, the mole fractions, volume fractions and/or mass fractions of the k components of the measured medium which are not measured are assigned by means of a function f, wherein the function f is dependent on the qualitative chemical composition of the measured medium and/or on the mole fractions, volume fractions and/or mass fractions of the measured m components. The qualitative chemical composition shows, in such case, the components present in the measured medium, but not, however, their mole fractions, volume fractions and/or mass fractions. A quantitative description then delivers the exact data concerning the individual mole fractions, volume fractions and/or mass fractions of the components.

In the case of an additional further development of the invention, q components—wherein q is equal to k minus p, wherein p is smaller than or equal to k minus one—in each case take a predeterminable, fixed value. This is naturally true only for values of k greater than or equal to two, wherein p is then greater than or equal to one. The mole fractions, volume fractions and/or mass fractions of the p components are changed corresponding to a specification, or corresponding to the function f, wherein the mole fractions, volume fractions and/or mass fractions of the q components are assigned a fixed value. If the mole fraction, volume fraction and/or mass fraction of one of the measured m components changes, only the mole fractions, volume fractions and/or mass fractions of the p components are thus changed, while the mole fractions, volume fractions and/or mass fractions of the q components remain unchanged.

In such case, the p components are so established according to the estimatable mole distribution, volume distribution and/or mass distribution of the individual components in the measured medium that the sum of the mole fractions, volume fractions and/or mass fractions of the n components amounts to one.

A further development of the method of the invention provides that the q components—wherein q is equal to k minus p, wherein p is smaller than or equal to k minus one—with the estimatably smallest mole fractions, volume fractions and/or mass fractions, in each case take a predeterminable fixed value. There exist measured media with a plurality of components, where some few components, in each case, lay claim to a relatively high mole fraction, volume fraction and/or mass fraction of the total measured medium. The other components have, in contrast, only a small, and, in addition, most often steady mole fraction, volume fraction and/or mass fraction, or one constant in time. Thus, if the measured medium changes, most often only the mole fractions, volume fractions and/or mass fractions of the components with the highest mole fractions, volume fractions and/or mass fractions change. These must then also be measured, or, if they are not measured, must at least be adjusted in such a manner, that the sum of the mole fractions, volume fractions and/or mass fractions of the n components amounts to one, wherein the components steady or constant in time are, in each case, assigned a predetermined, fixed mole fraction, volume fraction and/or mass fraction. Which components are assigned a fixed value and which are measured is estimated beforehand.

A further development of the method of the invention provides that p is equal to 1. This shall be explained by means of an example of an embodiment. Typically, in the case of a biogas, the $CH_4$ part and the $CO_2$ part vary, wherein the $H_2S$ part can be viewed as being relatively constant. According to the invention, one or more components are measured; here, for example, the $CH_4$ part is determined. Additionally, exactly one non-measured component is assigned a value in such a manner, that the sum of the mole fractions, volume fractions and/or mass fractions of all components amounts to one, wherein the other non-measured components are assigned values corresponding to their estimated part in the measured medium. Since the $H_2S$ part is assumed to be constant, precisely its part in the measured medium is estimated and assigned corresponding to the estimation. The $CO_2$ part is, in contrast, changed in such a manner that the sum of the three fractions again yields one.

In this example, at least two fewer components than the number the actually fluid has are thus registered in their quantity by a direct or indirect measuring. The mole fraction, volume fraction and/or mass fraction of exactly one first component is determined, and exactly one second component is changed in such a manner, that the sum of the mole fractions, volume fractions and/or mass fractions of all components amounts to one, wherein the mole fractions, volume fractions and/or mass fractions of the other components of the measured medium are held constant, or set, as the case may be.

Other examples of embodiments are thinkable, where at least two components are measured and/or unmeasured components are changed, which take, for example, the highest mole fractions, volume fractions and/or mass fractions of the non-measured components in the measured medium.

In a further development of the method of the invention, it is provided that the mole fraction, volume fraction and/or mass fraction of a first component of the measured medium is determined, and the mole fraction, volume fraction and/or mass fraction of a second component of the measured medium is established in such a manner, that the sum of the mole fractions, volume fractions and/or mass fractions of all components of the measured medium amounts to one, wherein the mole fractions, volume fractions and/or mass fractions of the other components of the measured medium are assigned a value characteristic for the measured medium.

If, for example, a gas mixture with a plurality of components is present as the fluid to be measured, and a gas analyzer is applied in order to determine the quantitative chemical composition of the gas mixture, wherein the gas analyzer can only determine the mole quantity of one component of the measured medium, wherein the sum of all mole amounts of the gas mixture of n components is known, the mole fraction of the measured first component of the measured medium can then be calculated. This amounts to y=0 . . . 100 mol %. The sum of the first and the second component of the gas mixture thus results to $$\chi_{Gas_1+Gas_2} = 100\% - \sum_{i=3}^{n} \chi_{Gas_i}.$$

The measured mole fraction of the first component corresponds to $\chi_{Gas_1}=\max(y,\chi_{Gas_1+Gas_2})$. From this, the mole fraction in mol % of the second component of the measured medium is $\chi_{Gas_2}=\chi_{Gas_1+Gas_2}-\chi_{Gas_1}$.

If, for example, biogas with a fixed $H_2S$ fraction of 2 mol % is used, and the $CH_4$ fraction is measured, the $CO_2$ fraction is then calculated as follows: $\chi_{CH_4}=\max(\gamma,\chi_{CH_4+CO_2})$ with $\chi_{CH_4+CO_4}=100\%-\chi_{H_2S}=100\%-2\%=98\%$ it follows that $\chi_{CH_4}=\max(\gamma,98\%)$ and therewith $\chi_{CO_2}=\chi_{CH_4+CO_2}-\chi_{CH_4}=98\%-\chi_{CH_4}$.

A further development of the solution of the invention provides that the mole fractions, volume fractions and/or mass fractions of the m components of the measured medium are measured by means of a first measuring device, and are made available to a second measuring device for determining the at least one variable dependent on at least the chemical composition of a measured medium.

In the case of a further development of the method of the invention, the mole fractions, volume fractions and/or mass fractions of the m components of the measured medium are made available to the second measuring device via an interface between the first and second measuring devices. The data concerning the mole fractions, volume fractions and/or mass fractions of the m measured components can, in such case, be transmitted to the second measuring device via a data interface provided therefor, a BUS, e.g. the HART-protocol, Profi-bus or a bus of Foundation-Fieldbus, or, alternatively, via an electrical current input, e.g. a typical 4-20 mA interface. The data are therewith automatically ascertainable and transmittable online. If a number of parameters are transmitted, e.g. the data concerning the mole fractions, volume fractions and/or mass fractions of a plurality of components, transmission via BUS is especially suitable.

In a further development of the method of the invention, the at least one variable to be determined, which is dependent on at least the chemical composition of a measured medium, is the flow of the measured medium through the measuring tube. A method for determining and/or monitoring the flow of a measured medium through a measuring tube is thus involved, wherein the chemical composition of the measured medium is taken into consideration for determining and/or monitoring the flow of the measured medium through the measuring tube.

In a further development of the solution of the invention, the flow is determined with a thermal, mass flow, measuring device.

Another further development of the invention provides that the mole fractions, volume fractions and/or mass fractions of those m components of the measured medium are determined, which components essentially determine the heat transfer behavior of the measured medium in the thermal, mass flow, measuring device. Thus, for example, at least 50% of the heat transfer behavior, especially at least 60%, especially at least 70%, especially at least 80% or at least 90% is determined by the m components of the measured medium, for which the mole fractions, volume fractions and/or mass fractions are measured or changed in such a manner, that the sum of the mole fractions, volume fractions and/or mass fractions of all components of the measured medium amounts to one, wherein all other components are assigned a predetermined, fixed value.

In an example of an embodiment, the mole fractions, volume fractions and/or mass fractions of those two components in the measured medium are measured and/or changed, which have the largest influences on the heat conduction coefficient and/or heat transfer coefficient of the measured medium in the thermal, mass flow, measuring device. The ratio of mass and thermal conductivity plays a non-negligible role in thermal, flow measurement. A thermal, mass flow, measuring system is, as a rule, dependent on the thermal conductivity K and the specific heat capacity, or specific heat capacities, $c_p$, of the measured medium at constant pressure. Other measuring systems are alternatively or additionally dependent on the specific heat capacity, respectively specific heat capacities, $c_V$, of the measured medium at constant volume and/or the heat transfer coefficient h, wherein $c_p = c_V * R_s$, with $R_s = R/M$, with R being the general gas constant and M the mol mass.

Another further development of the invention provides that the measured medium is a biogas.

A further development of the method of the invention provides that the measured medium is biogas containing the components $CH_4$, $CO_2$ and $H_2S$, wherein the mole fraction of $CH_4$ is measured and is provided for the method, the mole fraction of $H_2S$ is assigned the value 0.02 and the mole fraction of $CO_2$ is assigned in such a way, that the sum of the three mole fractions is 1.

Additionally, the object of the invention is achieved by a thermal, mass flow, measuring device for determining and/or monitoring flow of a measured medium through a measuring tube, wherein the device has two temperature sensors and a control/evaluation unit; wherein the two temperature sensors are arranged in a housing region facing the measured medium and are in thermal contact with the measured medium flowing through the measuring tube; wherein a first temperature sensor is embodied in a heatable manner; wherein a second temperature sensor provides information concerning the current temperature of the measured medium; wherein the control/evaluation unit, on the basis of temperature difference ($\Delta T$) between the two temperature sensors and/or on the basis of heating power (Q) supplied to the first temperature sensor, determines the mass flow of the measured medium; wherein the thermal, mass flow, measuring device is embodied in such a manner, that the quantitative chemical composition of the measured medium is automatically determinable in the thermal, mass flow, measuring device; wherein the respective mole fractions, volume fractions and/or mass fractions of m components of the measured medium—wherein the measured medium has a total of n components, wherein m is smaller than n—are known to the thermal, mass flow, measuring device; wherein the mole fractions, volume fractions and/or mass fractions of k components of the measured medium, which are not known—wherein k is equal to n minus m—are assignable in such a manner, that the sum of the mole fractions, volume fractions and/or mass fractions of the n components amounts to one. The mole fractions, volume fractions and/or mass fractions of m components of the measured medium are thus reportable to the thermal, mass flow, measuring device, i.e. they are inputtable to the thermal, mass flow, measuring device, or the values of the mole fractions, volume fractions and/or mass fractions of m components of the measured medium are metrologically—thus via a direct or indirect measuring—ascertainable by the thermal, mass flow, measuring device itself, so that relevant data concerning the mole fractions, volume fractions and/or mass fractions of m components of the measured medium device are present for the thermal, mass flow measuring.

In an additional further development of the solution of the invention, the thermal, mass flow, measuring device includes an interface, wherein, via the interface, values ascertained by a first measuring device for the mole fractions, volume fractions and/or mass fractions of m components of the measured medium having a total of n components are readable by the thermal, mass flow, measuring device, and the values for the mole fractions, volume fractions and/or mass fractions of the m components of the measured medium are processable in the control/evaluation unit.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
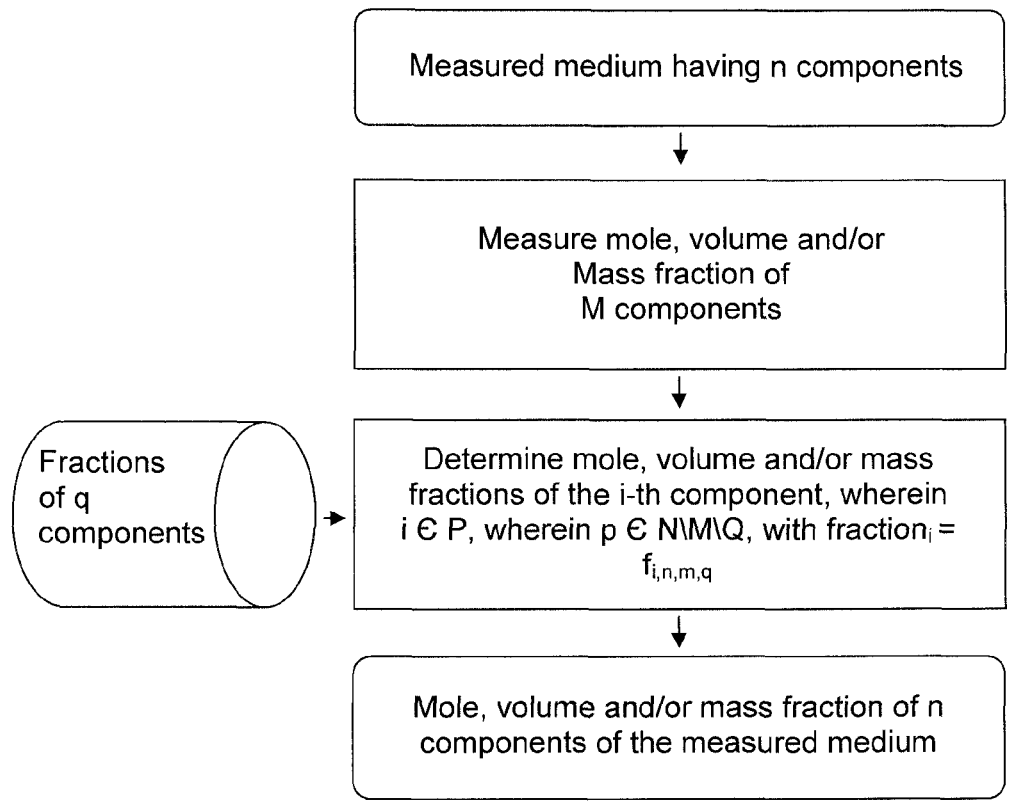
FIG. 1 is a flow diagram of the method of the invention.

FIG. 1 shows a flow diagram of a form of embodiment of the method of the invention. The mole fractions, volume fractions and/or mass fractions of m components of the measured medium having a total of n components are metrologically ascertained. The values of q components are already assigned prior to the measuring. Alternatively, they are dependent on the ascertained data of the m components. The mole fractions, volume fractions and/or mass fractions of the remaining p components of the measured medium are determined via a function f, wherein the function f, for its part, is dependent on the qualitative chemical composition of the measured medium, the ascertained values of the mole fractions, volume fractions and/or mass fractions of the m components and the assigned values of the mole fractions, volume fractions and/or mass fractions of the q components. All n components of the measured medium are, in such case, elements of the amount N. Equally, the m measured components are part of the amount M, the q components are correspondingly elements of the amount Q and all p components are part of the amount P.

Figure 2:
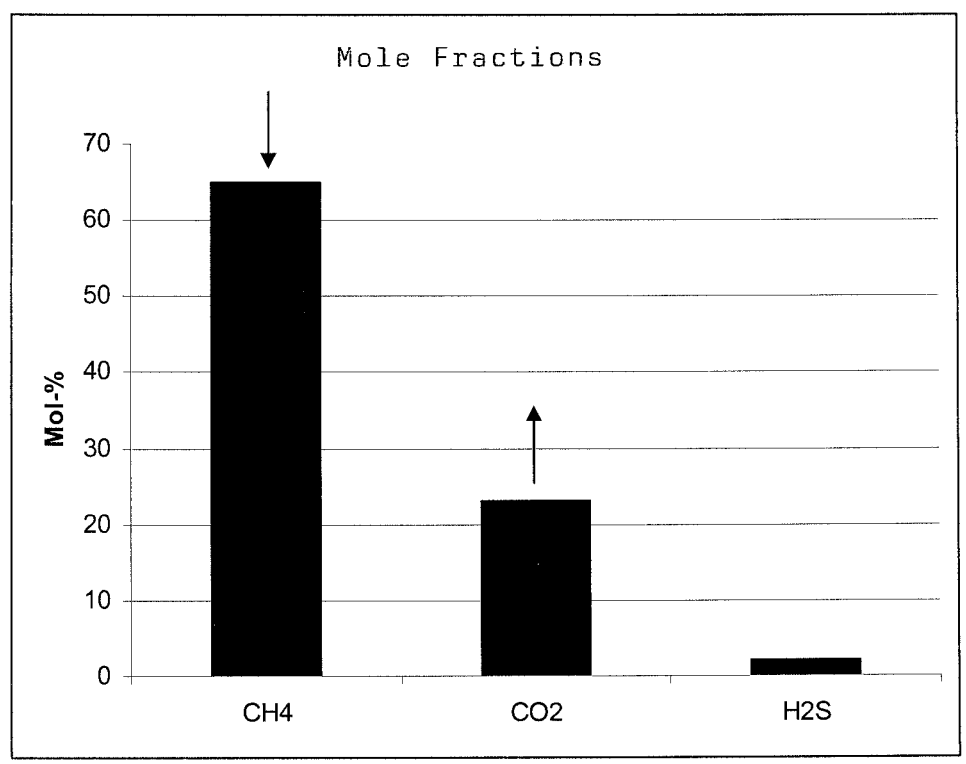
FIG. 2 is a material quantity distribution diagram of biogas.

FIG. 2 discloses a bar chart with the mole fractions of the components $CH_4$, $CO_2$ and $H_2S$ of biogas. In the case of biogas, the $CH_4$ part and the $CO_2$ part most often vary strongly. The $H_2S$ part is, in contrast, rather stable. The $CH_4$ part, here in mol %, is measured in this example with a gas analyzer. The measured value of the $CH_4$ fraction is then transferred to a thermal, mass flow, measuring device. Alternatively, the gas analyzer can also be a component of the flow measuring device. If the measured $CH_4$ fraction sinks, as is illustrated here with the arrow, the $CO_2$ part is correspondingly adjusted, i.e. it is, in the case of a fixed $H_2S$ fraction, increased in such a manner, that the sum of the fractions of the three components of the gas mixture are again 100%. The calculational specification for this case is as follows:

The sum of the three mole fractions of the biogas is one or 100%:

$$\sum_{i=1}^{n} \chi_i = 1 = \chi_{CH_4} + \chi_{CO_2} + \chi_{H_2S};$$

with $\chi_{CH_4} = \chi_{CH_4,measured}$ and $\chi_{H_2S} = \chi_{H_2S,established} = 2\%$ then it follows that:

$\chi_{CO_2} = 100\% - \chi_{CH_4,measured} - \chi_{H_2S,established} = 100\% - 2\% - \chi_{CH_4,measured} = 98\% - \chi_{CH_4,measured}$.

Figure 3:
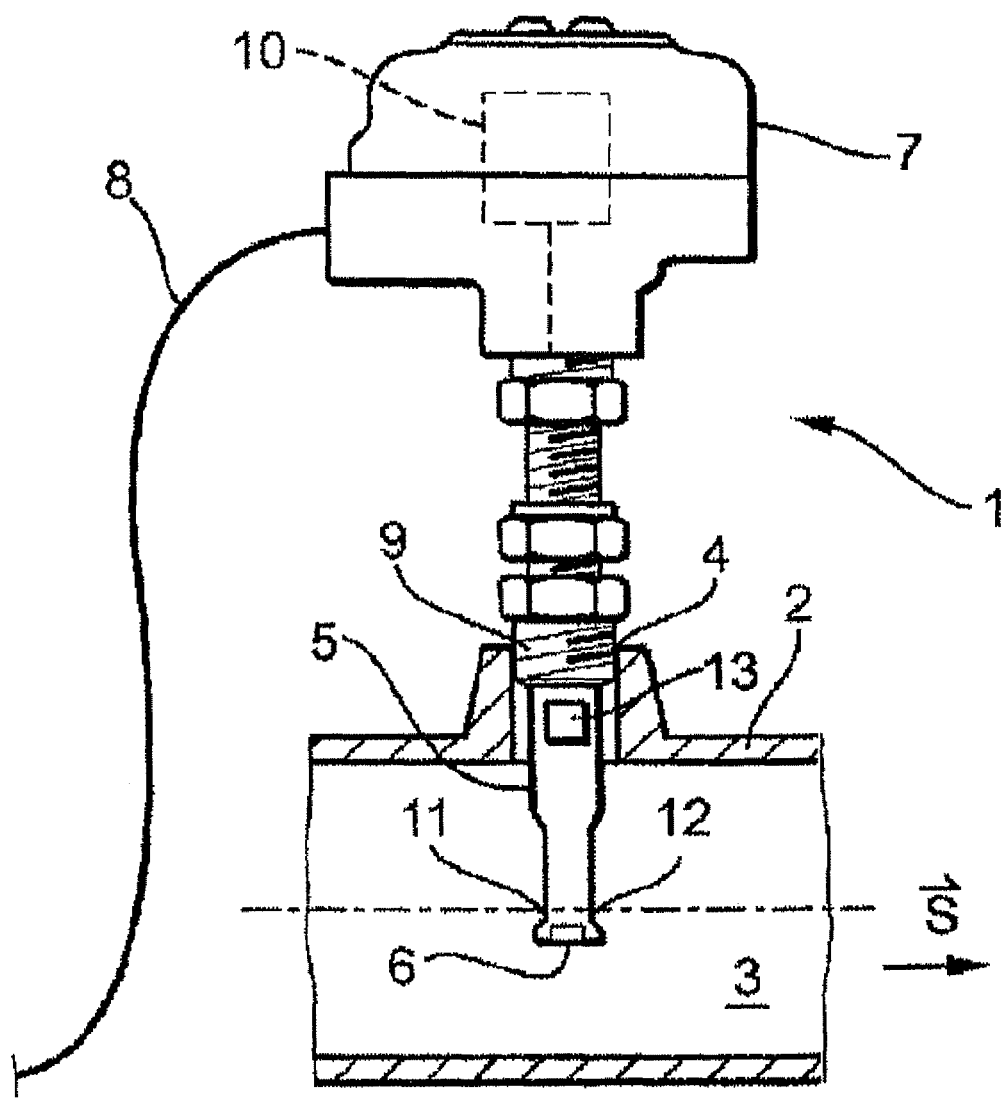
FIG. 3 is a thermal, flow measuring device of the invention.

FIG. 3 shows a schematic representation of the thermal, flow measuring device 1 of the invention having a thermal, flow sensor 6 and measurement transmitter 7. The flow measuring device 1 is secured via a screw thread 9 in a nozzle 4, which is located on the pipeline 2. In the pipeline 2 is located the flowing medium 3. Alternatively, an option is to construct the flow measuring device 1 with an integrated measuring tube as an inline measuring device.

The temperature measuring device, which is the essential part of the sensor 6, is located in the of housing 5 facing the medium 3. Operation of the temperature sensors 11, 12 and/or evaluation of the measuring signals delivered by the temperature sensors 11, 12 occurs via the control/evaluation unit 10, which, in the case shown, is arranged in the measurement transmitter 7. Via the connection 8, communication occurs with a remote control location (not separately illustrated in FIG. 3), and/or with a first measuring device (not shown), which, for example, makes available the data concerning the ascertained mole fractions, volume fractions and/or mass fractions of the m components of the medium. The control/evaluation unit 10 has available, in such case, an interface (not shown), via which the data for the ascertained mole fractions, volume fractions and/or mass fractions of the m components of the medium are read and then processed in the control/evaluation unit 10.

As already mentioned earlier, at least one of the two temperature sensors 11, 12 can be an electrically heatable, resistance element, a so-called RTD sensor or TFRTD sensor. Of course, in connection with the solution of the invention, a typical temperature sensor, e.g. a Pt100 or Pt1000 or a thermocouple, which is associated with a thermally coupled heating unit 13, can also be applied. The heating unit 13 is arranged in FIG. 3 in the housing 5 and thermally coupled to the heatable temperature sensor 11, 12, but largely decoupled from the medium. The coupling or the decoupling occurs preferably by filling the corresponding intermediate spaces with highly thermally conductive and, respectively poorly thermally conductive material. Preferably, a potting compound is utilized for this.

With the flow measuring device 1, an option is to measure the mass flow continuously; alternatively, an option is to use the flow measuring device 1 as a switch, which displays the changing of a switch state, always when at least one predetermined limit value is subceeded or exceeded.

Advantageously, it is moreover provided that the two temperature sensors 11, 12 are embodied in a heatable manner, wherein the desired function of the first temperature sensor 11 or of the second temperature sensor 12 is determined by the control/evaluation unit 10. For example, one option is that the control/evaluation unit 10 alternately operates the two temperature sensors 11, 12 as active or passive temperature sensors 11, 12, and the measured value of the flow is determined by averaging the measured values delivered by both temperature sensors 11, 12.

LIST OF REFERENCE CHARACTERS 1 thermal, flow measuring device
2 measuring tube
3 measured medium
4 nozzle
5 housing
6 sensor
7 transmitter
8 connecting line
9 screw thread
10 control/evaluation unit
11 first temperature sensor
12 second temperature sensor
13 heating unit

The invention claimed is:

1. A method for determining at least one variable dependent at least on the chemical composition of a measured medium, wherein the measured medium has n components, wherein n is greater than or equal to two, comprising the step of:
measuring each mole fraction, volume fraction and/or mass fraction of m components of the measured medium, wherein:
m is smaller than or equal to n minus one;
mole fractions, volume fractions and/or mass fractions of k components of the measured medium, which are not measured;
k is equal to n minus m, established in such a manner, that a sum of the mole fractions, volume fractions and/or mass fractions of the n components amounts to one; and
the mole fraction, volume fractions and/or mass fractions of the k components of the measured nedium which are not measured, are assigned by means of a function f, wherein the function f is dependent on the qualitative chemical composition of the measured medium and/or on the molefractions, volume fractions and/or mass fractions of the m measured components.

2. The method as claimed in claim 1, wherein:
there are q components, with q equal to k minus p; and
p is smaller than or equal to k minus one, and in each case take a predetermined, fixed value.

3. The method as claimed in claim 1, wherein:
there are q components, with q equal to k minus p; and
p is smaller than or equal to k minus one, with estimatably smallest mole fractions, volume fractions and/or mass fractions take predeterminable, fixed values.

4. The method as claimed in claim 3, wherein:
p is equal to 1.

5. The method as claimed in claim 1, wherein:
the mole fraction, volume fraction and/or mass fraction of a first component of the measured medium is determined, and the mole fraction, volume fraction and/or mass fraction of a second component of the measured medium is assigned in such a manner, that a sum of the mole fractions, volume fractions and/or mass fractions of all components of the measured medium amounts to one; and
the mole fractions, volume fractions and/or mass fractions of other components of the measured medium are assigned values characteristic for the measured medium.

6. The method as claimed in claim 1, wherein:
the mole fractions, volume fractions and/or mass fractions of the m components of the medium are measured by means of a first measuring device and are made available to a second measuring device for determining the at least one variable dependent on at least the chemical composition of a measured medium.

7. The method as claimed in claim 6, wherein:
the mole fractions, volume fractions and/or mass fractions of the m components of the measured medium are made available to the second measuring device via an interface between the first and second measuring devices.

8. The method as claimed in claim 1, wherein:
the at least one variable to be determined, which is dependent on at least the chemical composition of a measured medium, is flow of the measured medium through the measuring tube.

9. The method as claimed in claim 8, wherein:
flow is determined with a thermal, mass flow, measuring device.

10. The method as claimed in claim 9, wherein:
those mole fractions, volume fractions and/or mass fractions of the m components of the measured medium are determined, which essentially determining heat transfer behavior of the measured medium in the thermal, mass flow, measuring device.

11. The method as claimed in claim 1, wherein:
the measured medium is a biogas.

12. The method as claimed in claim 1, wherein:
the measured medium is a biogas having components $CH_4$, $CO_2$ and $H_2S$; and
the mole fraction of $CH_4$ is measured and provided for the method, the mole fraction of $H_2S$ is assigned a value of 0.02, and the mole fraction of $CO_2$ is assigned in such a manner, that a sum of the three mole fractions is 1.

13. A thermal, mass flow, measuring device for determining and/or monitoring flow of a measured medium through a measuring tube, comprising:
two temperature sensors; and
a control/evaluation unit, wherein:
said two temperature sensors are arranged in a region of a housing facing the measured medium and are in thermal contact with the measured medium flowing through said measuring tube;
a first temperature sensor is embodied in a heatable manner;
a second temperature sensor provides information concerning a current temperature of the measured medium;
said control/evaluation unit, on basis of a temperature difference between the two temperature sensors and/or on the basis of a heating power supplied to aid first temperature sensor, determines mass flow of the measured medium;
the thermal, mass flow, measuring device is embodied in such a manner, that a quantitative chemical composition of the measured medium is automatically determinable in the thermal, mass flow, measuring device;
the respective mole fractions, volume fractions and/or mass fractions of m components of the medium-wherein the measured medium has a total of n components, wherein m is smaller than n-are known to the thermal, mass flow, measuring device; and
the mole fractions, volume fractions and/or mass fractions of the k components of the measured medium which are not known—wherein k is equal to n minus m-are determinable in such a manner, that a sum of the mole fractions, volume fractions and/or mass fractions of the n components amounts to one.

14. The thermal, mass flow, measuring device as claimed in claim 13, wherein:

values ascertained by a first measuring device for the mole fractions, volume fractions and/or mass fractions of m components of the measured medium with a total of n components are readable by the thermal, mass flow, measuring device via an interface and are processable in the control/evaluation unit.

* * * * *